United States Patent
Sauvinet

(10) Patent No.: US 11,230,088 B2
(45) Date of Patent: Jan. 25, 2022

(54) LAMINATED GLAZING

(71) Applicant: SAINT-GOBAIN GLASS FRANCE, Courbevoie (FR)

(72) Inventor: Vincent Sauvinet, Grenoble (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/969,816

(22) PCT Filed: Feb. 12, 2019

(86) PCT No.: PCT/FR2019/050302
§ 371 (c)(1),
(2) Date: Aug. 13, 2020

(87) PCT Pub. No.: WO2019/158850
PCT Pub. Date: Aug. 22, 2019

(65) Prior Publication Data
US 2020/0369004 A1   Nov. 26, 2020

(30) Foreign Application Priority Data
Feb. 14, 2018   (FR) ...................................... 1851244

(51) Int. Cl.
| | |
|---|---|
| *B32B 17/10* | (2006.01) |
| *B32B 27/30* | (2006.01) |
| *B32B 37/24* | (2006.01) |
| *B32B 1/00* | (2006.01) |
| *C03B 23/023* | (2006.01) |
| *C03C 21/00* | (2006.01) |
| *C03C 4/02* | (2006.01) |
| *C03C 3/078* | (2006.01) |
| *C03C 3/083* | (2006.01) |
| *C03C 3/087* | (2006.01) |
| *C03C 4/18* | (2006.01) |

(52) U.S. Cl.
CPC ............ *B32B 17/1011* (2013.01); *B32B 1/00* (2013.01); *B32B 17/10036* (2013.01); *B32B 17/10137* (2013.01); *B32B 17/10761* (2013.01); *B32B 17/10889* (2013.01); *B32B 17/10944* (2013.01); *B32B 27/30* (2013.01); *B32B 37/24* (2013.01); *C03B 23/023* (2013.01); *C03C 3/078* (2013.01); *C03C 3/083* (2013.01); *C03C 3/087* (2013.01); *C03C 4/02* (2013.01); *C03C 4/18* (2013.01); *C03C 21/002* (2013.01); *B32B 2307/4026* (2013.01); *B32B 2315/08* (2013.01); *B32B 2329/06* (2013.01); *B32B 2605/006* (2013.01); *B32B 2605/08* (2013.01)

(58) Field of Classification Search
CPC ......... B32B 17/10; B32B 27/30; B32B 37/24; B32B 1/00; C03B 23/023; C03C 21/00; C03C 4/02; C03C 4/18; C03C 3/078; C03C 3/087; C03C 3/083
USPC ....................................................... 428/174
See application file for complete search history.

(56) References Cited

U.S. PATENT DOCUMENTS

| | | | |
|---|---|---|---|
| 2018/0362390 A1* | 12/2018 | Claireaux | ........... B32B 17/1011 |
| 2019/0308394 A1* | 10/2019 | Alkemper | ......... B32B 17/10036 |

FOREIGN PATENT DOCUMENTS

| | | | | |
|---|---|---|---|---|
| CA | 1161348 A | * | 1/1984 | ........... C03B 23/027 |
| EP | 0 452 207 A1 | | 10/1991 | |
| FR | 2 484 398 A | | 12/1981 | |
| WO | WO 2017/103528 A1 | | 6/2017 | |
| WO | WO-2017103528 A1 | * | 6/2017 | ............... C03C 4/18 |

OTHER PUBLICATIONS

International Search Report as issued in International Patent Application No. PCT/FR2019/050302, dated May 21, 2019.

* cited by examiner

*Primary Examiner* — Tahseen Khan
(74) *Attorney, Agent, or Firm* — Pillsbury Winthrop Shaw Pittman LLP

(57) ABSTRACT

A curved laminated glazing includes an outer sheet of a soda-lime-silica colored glass and an inner sheet of a chemically-toughened sodium aluminosilicate clear glass having a thickness e2 ranging from 0.4 to 1.1 mm, the outer and inner sheets being joined together by a lamination interlayer, the colored glass having a chemical composition comprising a weight content of total iron, expressed in the form $Fe_2O_3$, ranging from 0.6 to 2.2%, the glasses of the inner and outer sheets being selected so that $0 \leq T10_{in} - T10_{out} \leq 20°$ C., where $T10_{in}$ is the temperature T10 of the glass of the inner sheet and $T10_{out}$ is the temperature T10 of the glass of the outer sheet, the temperature T10 being the temperature at which the glass considered has a viscosity of $10^{10}$ dPa·s.

20 Claims, No Drawings

LAMINATED GLAZING

CROSS-REFERENCE TO RELATED APPLICATIONS

This application is the U.S. National Stage of PCT/FR2019/050302, filed Feb. 12, 2019, which in turn claims priority to French patent application number 1851244 filed Feb. 14, 2018. The content of these applications are incorporated herein by reference in their entireties.

The invention relates to the field of laminated glazings, more particularly motor vehicle laminated glazings, in particular used as windshields, roofs or side windows.

Laminated glazings are glazings in which two glass sheets are adhesively bonded together by a lamination interlayer which has the ability to retain glass fragments in the event of breakage. The lamination interlayer may also fulfill other functions, for example break-in resistance, acoustic, thermal, etc. functions. The lamination interlayer generally comprises at least one polymer sheet, typically made of polyvinyl butyral, capable of softening during the lamination treatment and of adhering to the glass sheets.

Laminated glazings are used in motor vehicles as windshields, and sometimes as side windows or roofs. In this regard, they must meet an increasing number of requirements, including mechanical requirements (they must withstand gravel impact), physical requirements (they must be as light as possible so as to penalize the energy consumption of the vehicle as little as possible), optical requirements (their transmission in the visible range must be sufficient to allow good visibility for the driver) and thermal requirements (their transmission of solar radiation must be low so as, in summer, to reduce the solar heat gains and therefore the need for air conditioning), not to mention cost requirements. Some of these requirements are contradictory, since a lighter glazing is a thinner glazing, that will have a tendency to withstand gravel impact less well and to transmit infrared radiation more.

"Hybrid" laminated glazings comprising a thin, clear and chemically-toughened glass, generally of sodium aluminosilicate, joined to a soda-lime-silica colored glass may meet these various requirements.

Other requirements themselves relate to the process for manufacturing these glazings, and to their impact on the presence or absence of defects. In particular, the laminated glazings are generally curved and the two glass sheets of the laminated glazing must be able to be bent together so as to ensure a perfect assembly and prevent any optical distortions. In order to do this, the two glass sheets are superposed, the inner sheet being positioned above the outer sheet, and are introduced into a bending furnace, where they soften. The bending may in particular be a gravity bending, in which the glass sheets deform under their own weight, the deformation being adjusted by means of specific equipment. The bending may also be press bending, the glass sheets being pressed against a mold. To prevent the glass sheets from sticking to one another during the bending, it is possible to keep them at a distance by positioning between them an interlayer powder that ensures a space of several tens of micrometers. This small space, by limiting the rate of penetration of air via the edges between the two glass sheets, further makes it possible to create a suction effect that is particularly favorable in the case where the inner glass is a thin glass, since it makes it possible to limit the tendency that thin glasses have to form, during the bending, corrugations at the edges by "forcing" the inner thin glass to follow the deformation of the outer glass. However it turns out that this suction effect is insufficient when sodium aluminosilicate glasses and soda-lime-silica glasses are bent together. Undesirable edge corrugations are then formed which are even greater when the glazing has a complex shape, in particular a large double curvature.

The invention proposes solving these various problems, and particularly preventing formation of edge corrugations.

In this regard, one subject of the invention is a curved laminated glazing comprising an outer sheet of a soda-lime-silica colored glass and an inner sheet of a chemically-toughened sodium aluminosilicate clear glass having a thickness e2 ranging from 0.4 to 1.1 mm, in particular from 0.4 to 0.7 mm, said outer and inner sheets being joined together by means of a lamination interlayer, said colored glass having a chemical composition comprising a weight content of total iron, expressed in the form $Fe_2O_3$, ranging from 0.6 to 2.2%, and the glasses of the inner and outer sheets being selected so that $0 \leq T10_{in} - T10_{out} \leq 20°$ C., where $T10_{in}$ is the temperature T10 of the glass of the inner sheet and $T10_{out}$ is the temperature T10 of the glass of the outer sheet, the temperature T10 being the temperature at which the glass considered has a viscosity of $10^{10}$ dPa·s Another subject of the invention is a glazing for a transport vehicle, in particular a motor vehicle, in particular a motor vehicle windshield or roof, comprising a laminated glazing according to the invention.

Another subject of the invention is a process for obtaining a laminated glazing according to the invention. This process comprises the following successive steps:

a bending step, wherein a sheet of a sodium aluminosilicate clear glass having a thickness e2 ranging from 0.4 to 1.1 mm, referred to as inner glass sheet and intended to become the inner sheet of the glazing, and a sheet of a soda-lime-silica colored glass having a chemical composition comprising a weight content of total iron, expressed in the form $Fe_2O_3$, ranging from 0.6 to 2.2%, referred to as outer glass sheet and intended to become the outer sheet of the glazing, are bent together, said inner glass sheet being positioned above said outer glass sheet, the two glass sheets being separated by means of an interlayer powder, then a chemical toughening step, wherein the inner glass sheet is bought into contact with a molten potassium salt, then a lamination step, wherein the inner and outer glass sheets are joined together by means of a lamination interlayer.

The inventors have been able to demonstrate that a judicious choice of $T10_{in}$ and $T10_{out}$ temperatures made it possible to prevent the appearance of edge corrugations in the thin glass during the bending of the glass sheets. It has further turned out that it was possible to achieve adequate $T10_{out}$ values using a soda-lime-silica glass, the chemical composition of which is adjusted relative to that of the standard glass conventionally used for the production of glazings for the building industry or transport industry.

The unit dPa·s is also frequently referred to as "poise" in glass technology. The temperature T10 is preferably measured according to the standard ISO 7884-3 using a fiber elongation viscometer. The temperature T10 is measured on the glass before any (optional) chemical toughening.

If $T10_{in} - T10_{out}$ is denoted by $\Delta T10$, then, according to the invention, $0 \leq \Delta T10 \leq 20°$ C.

$\Delta T10$ must be zero or positive. Preferably $\Delta T10$ is strictly positive, in particular at least 5° C., or else 10° C. Indeed, it has turned out that it was advantageous for the inner glass to be slightly more viscous than the outer glass in order to prevent, during the bending, the formation of marks on the inner glass owing to the pressure of the latter on the interlayer powder.

ΔT10 is preferably at most 18° C., in particular 15° C. This is because too high a difference ΔT10 leads to the formation of undesirable edge corrugations.

The inner sheet is understood to mean the glass sheet intended to be positioned on the inside of the passenger compartment of the vehicle. This sheet is therefore located on the concave side of the glazing. In contrast, the outer sheet, intended to be positioned on the outside of the passenger compartment of the vehicle, is located on the convex side of the glazing. By extension, the inner, respectively outer, (glass) sheet is also described as the glass sheet intended to become, after the bending, chemical toughening and lamination steps, the inner, respectively outer, sheet of the final glazing.

The glazing preferably consists of the outer sheet, the inner sheet and the lamination interlayer, which does not however exclude one of these constituents from being coated with layers or stacks of layers, as described below.

The choice of the thicknesses of the inner and outer sheets has a particularly significant impact on the resistance to gravel impact. Specifically, it turns out that the resistance to gravel impact decreases with the total thickness of the laminated glazing but increases when the thickness of the inner sheet decreases.

The thickness e1 of the outer sheet is preferably at most 2.4 mm, in particular 2.3 mm, or else 2.2 mm or 2.1 mm. It is preferably at least 1.6 or 1.7 mm. The thickness e1 is advantageously within a range of from 1.6 to 2.4 mm.

The thickness e2 of the inner sheet is preferably at most 1.0 mm, in particular 0.9 mm, or else 0.8 mm or 0.7 mm. The thickness e2 is preferably at least 0.5 mm.

The thickness e2 is advantageously less than the thickness e1.

In order to optimize the resistance to gravel impact, the ratio $R=e2/e1^2$ is advantageously at most 0.40, in particular 0.35 or 0.30, in particular 0.25, or else 0.20. It is preferably at least 0.10.

Particularly advantageous e1/e2 thickness pairs are in particular:
e1=1.6 mm and e2=0.5 mm
e1=1.6 mm and e2=0.7 mm
e1=1.8 mm and e2=0.5 mm
e1=1.8 mm and e2=0.7 mm
e1=2.1 mm and e2=0.5 mm
e1=2.1 mm and e2=0.7 mm The inner sheet is made of a chemically-toughened sodium aluminosilicate clear glass having a thickness e1 ranging from 0.4 to 1.1 mm, preferably from 0.4 to 0.7 mm. This type of glass has proved capable of providing, in combination with the outer sheet, glazings that are both lightweight and mechanically strong.

The sodium aluminosilicate glass preferably comprises (before chemical toughening) from 55 to 73% by weight of $SiO_2$, from 2 to 20% by weight of $Al_2O_3$ and from 9 to 17% by weight of $Na_2O$. It further comprises, advantageously, from 2 to 11% by weight of MgO, from 0 to 10% by weight of $K_2O$, less than 3% by weight of CaO and less than 10%, in particular less than 5% by weight of $B_2O_3$.

More particularly, the sodium aluminosilicate glass preferably has (before chemical toughening) one of the following compositions, expressed as percentages by weight of oxides.

$SiO_2$: 55-71%, in particular 59-68%; $Al_2O_3$: 3-11%, in particular 4-10%; MgO: 4-11%, in particular 5-10%; $Na_2O$: 9-17%, in particular 10-14%; $K_2O$: 3-12%, in particular 5-11%; $B_2O_3$: <2%, in particular <0.5%; CaO: <1%, in particular <0.5%.

$SiO_2$: 55-70%, in particular 58-68%; $Al_2O_3$: 8-20%, in particular 9-18%; MgO: 2-8%, in particular 2-7%; $Na_2O$: 10-17%, in particular 11-16%; $K_2O$: 1 to 8%, in particular 1 to 6%; $B_2O_3$: <3%, in particular <2%; CaO: <1%, in particular <0.6%.

$SiO_2$: 60-73%, in particular 63-71%; $Al_2O_3$: 2-8%, in particular 3-6%; MgO: 6-11%, in particular 7-10%; $Na_2O$: 10-17%, in particular 11-16%; $K_2O$: <2%, in particular <1%; CaO: 0-3%, in particular 1-2%; $B_2O_3$: <2%, in particular <1%.

The expression "clear glass" is understood to mean a glass for which the light transmission (at actual thickness) is at least 90%. The light transmission is calculated from an experimental spectrum produced on the glass sheet considered, by taking into account the illuminant A defined by the standard ISO 11664-2 and the CIE 1931 reference observer (2°) defined by the standard ISO 11664-1. Clear glasses generally contain a weight content of total iron of at most 0.15%, in particular 0.1% and even 0.08%. However, the weight content of total iron of the clear glasses is generally at least 0.01% since the natural raw materials used in the melting of the glass contain iron impurities, and lower contents would require the use of particularly expensive raw materials. Clear glass does not generally contain colorants other than iron; in particular, it preferably does not contain cobalt oxide, chromium oxide, selenium, copper oxide, nickel oxide and oxides of rare-earth elements, apart from unavoidable impurities.

Chemical toughening (also referred to as "ion exchange") consists in bringing the surface of the glass into contact with a molten potassium salt (for example potassium nitrate), so as to reinforce the surface of the glass by exchanging ions from the glass (here sodium ions) with ions of larger ionic radius (potassium ions). This ion exchange in fact makes it possible to form compressive stresses at the surface of the glass and over a certain thickness. Preferably, the surface stress is at least 300 MPa, in particular 400 and even 500 MPa, and at most 700 MPa, and the thickness of the compression zone is at least 20 μm, typically between 20 and 50 μm. The stress profile may be determined in a known manner using a polarizing microscope equipped with a Babinet compensator. The chemical toughening step is preferably carried out at a temperature ranging from 380 to 480° C., and for a duration ranging from 30 minutes to 3 hours. The chemical toughening step is carried out after the bending, since the bending has the effect of de-toughening the glass.

The temperature $T10_{in}$ is preferably within a range of from 660 to 680° C., in particular from 660 to 675° C.

The outer sheet is made of a soda-lime-silica colored glass, the chemical composition of which comprises a weight content of total iron, expressed in the form $Fe_2O_3$, ranging from 0.6 to 2.2%.

The temperature $T10_{ext}$ is preferably within a range of from 655 to 675° C.

A soda-lime-silica glass is understood to mean a glass containing silica as former oxide and sodium and calcium oxides as modifier oxides. Soda-lime-silica glass generally has a chemical composition that comprises from 60 to 78% of silica ($SiO_2$), from 9 to 16% of soda ($Na_2O$) and from 5 to 15% of lime (CaO). As indicated in the remainder of the text, this soda-lime-silica glass is preferably not mechanically reinforced.

The outer sheet is preferably obtained by the float process, a process in which the molten glass is poured onto a bath of molten tin.

In order to provide $T10_{out}$ temperatures that are suitable for the sodium aluminosilicate glasses most commonly used, the colored glass advantageously has a chemical composition comprising the following constituents, in a weight content that varies within the limits defined below:

| | |
|---|---|
| $SiO_2$ | 68-75% |
| $Al_2O_3$ | 0-3% |
| CaO + MgO | 11-16.2% |
| MgO | 0-6.5% |
| $Na_2O$ | 9-12.4% |
| $K_2O$ | 0-1.5%. |

Although being of soda-lime-silica type, like standard glass, these compositions astonishingly make it possible to obtain $T10_{out}$ temperatures that are suitable for the $T10_{in}$ temperatures of the sodium aluminosilicate inner sheet.

The sum of the weight contents of $SiO_2$, $Al_2O_3$, CaO, MgO, $Na_2O$, $K_2O$ is preferably at least 95%, in particular 98%. The content of SrO, BaO and/or $ZrO_2$ is advantageously zero in order not to penalize the cost of the glass sheet. The content of antimony and arsenic oxides is also advantageously zero since these oxides are not compatible with the float process. The other constituents of the composition may be impurities originating from the raw materials or due to the degradation of the refractory materials of the melting furnace or refining agents (in particular $SO_3$).

Silica ($SiO_2$) is the main former element of the glass. At excessively low contents, the hydrolytic resistance of the glass, in particular in a basic medium, would be too greatly reduced. On the other hand, contents above 75% lead to a highly prejudicial increase in the viscosity of the glass. The content of silica is preferably at least 69%, in particular 70% and/or at most 74%, in particular 73%, or else 72%.

Alumina ($Al_2O_3$) makes it possible to increase the hydrolytic resistance of the glass and to reduce its refractive index. The content of alumina is preferably at least 0.5%, in particular 1%, 1.5% or 2% and/or at most 2.5%. Increasing the content of $Al_2O_3$ makes it possible to increase the $T10_{out}$ temperature.

The addition of lime (CaO) has the advantage of decreasing the high-temperature viscosity of the glass, and therefore facilitating the melting and refining thereof, while increasing the lower annealing temperature, and therefore the thermal stability. The increase in the liquidus temperature and in the refractive index that can be attributed to this oxide however result in the content thereof being limited. Magnesia (MgO) is useful for improving the chemical durability of the glass and reducing its viscosity. High contents result however in the risks of devitrification being intensified. The content of CaO is preferably at least 8%, or else 9% and even 10% and/or at most 13%, in particular 12%, or else 11%. Increasing the content of CaO and MgO makes it possible to increase the $T10_{out}$ temperature.

Soda ($Na_2O$) is useful for reducing the high-temperature viscosity and the liquidus temperature. Contents that are too high result however in the hydrolytic resistance of the glass and its thermal stability being degraded, while increasing the cost. The addition of soda reduces the $T10_{out}$ temperature. Potash ($K_2O$) has the same advantages and drawbacks. The content of $Na_2O$ is preferably at least 9.5%, in particular 10% or 11%, or else 11.5% and/or at most 12%. The content of $K_2O$ is preferably at most 1% and/or at least 0.5%.

According to a first preferred embodiment, the weight content of MgO is at most 1%, in particular 0.5% and even 0.1%. The content of CaO is advantageously at least 11.5%, or else 12%. The content of $Na_2O$ is preferably at least 10%, or else 11%. It is advantageously at most 12%. Particularly preferred compositions comprise the following constituents, in a weight content that varies within the limits defined below:

| | |
|---|---|
| $SiO_2$ | 71-74.2% |
| $Al_2O_3$ | 0-3% |
| CaO | 11.5-13% |
| MgO | 0-1% |
| $Na_2O$ | 11-12.4%, in particular 11-12%, |
| $K_2O$ | 0-1.5%. |

According to a second preferred embodiment, the weight content of MgO is at least 4%, or else 4.5% or 5% and/or at least 6%. The content of CaO is preferably between 9 and 11%, in particular between 9 and 10.5%. The content of $Na_2O$ is advantageously at least 9.5%, or else 10% and/or at most 12% or 11%. Particularly preferred compositions comprise the following constituents, in a weight content that varies within the limits defined below:

| | |
|---|---|
| $SiO_2$ | 70-74% |
| $Al_2O_3$ | 0-2% |
| CaO | 9-10.5% |
| MgO | 4-6.5%, in particular 4-6% |
| $Na_2O$ | 10-11% |
| $K_2O$ | 0-1%. |

According to a third embodiment, the weight content of CaO is at least 9%, in particular 10% and/or at most 12%, in particular 11%. The weight content of MgO is preferably at least 4% and/or at most 5%. The content of $Na_2O$ is preferably at least 11%.

Particularly preferred compositions comprise the following constituents, in a weight content that varies within the limits defined below:

| | |
|---|---|
| $SiO_2$ | 69-72%, in particular 69-71% |
| $Al_2O_3$ | 1-3%, in particular 1.7-3% |
| CaO | 10-12%, in particular 10.1-11% |
| MgO | 4-5% |
| $Na_2O$ | 11-12.4%, in particular 11.5-12% |
| $K_2O$ | 0-1%, in particular 0-0.3%. |

The weight content of total iron of the colored glass, expressed in the form $Fe_2O_3$, is preferably at least 0.7%, in particular 0.8%. It is preferably at most 1.9%, in particular 1.6%, or else 1.4%. It is preferably within a range of from 0.7 to 1.8%, in particular from 0.8 to 1.5%.

The redox ratio of the colored glass is preferably at least 0.22, in particular 0.25. It is preferably at most 0.31, in particular 0.30, or else 0.29 or 0.28. The redox ratio is preferably within a range of from 0.22 to 0.31, in particular from 0.24 to 0.29, or else from 0.25 to 0.27. The redox ratio corresponds to the ratio between the weight content of ferrous iron, expressed in the form FeO, and the weight content of total iron, expressed in the form $Fe_2O_3$.

This choice of weight contents of total iron and/or of redox ratio makes it possible to obtain glazings having good optical and thermal properties, in particular in terms of light transmission and direct solar transmission.

The colored glass preferably contains no colorants other than iron oxide or titanium oxide. The latter is an impurity frequently contained in certain raw materials and may contribute to lightly coloring the glass. The content of titanium oxide is generally at most 0.1%, or else 0.06%. The colored glass preferably does not contain cobalt oxide, nickel oxide, chromium oxide, selenium, copper oxide, vanadium oxide, manganese oxide. It preferably contains no rare-earth element oxide, in particular no cerium oxide. According to one variant, the colored glass may contain very small amounts of at least one aforementioned colorant in order to adjust the optical properties. In this case, the total content of colorants other than the iron and titanium oxides is preferably at most 40 ppm (1 ppm=0.0001%), in particular 30 or 20 ppm.

In order to improve the resistance to gravel impact, the outer sheet is preferably made of glass that is not mechanically reinforced. Therefore, in this case, it is neither toughened nor hardened. The expression "not mechanically reinforced" is understood to mean that the glass sheet has not been subjected to reinforcement by chemical toughening or using forced cooling means for the purpose of creating high compressive stresses at the surface of the glass sheet. This definition does not however exclude the possibility of using cooling means that are conventionally used and necessary for respecting the cycle times or for obtaining form stresses. During a process for forming motor vehicle glazings, it is in fact necessary to cool the glass after the forming thereof in order to respect the cycle times and to create form stresses by placing the periphery of the glazing under compression in order to increase the resistance of the edges to breaking. The expression "not mechanically reinforced" does not therefore exclude the presence of edge stresses.

The glass that is not mechanically reinforced is preferably such that the residual core tensile stress is at most 12 MPa, in particular 5 MPa, or else 2 MPa. Such stress values are in particular obtained with cooling rates of at most 1° C. per second after bending, more specifically between the outlet of the bending furnace and the zone in which the temperature of the glass corresponds to its annealing temperature. The measurement of the residual stress is in particular carried out on a test specimen obtained by cutting from the glazing a parallelepipedal test specimen of 10 mm×50 mm, by separating the first glass sheet from the lamination interlayer, for example by thermally treating the test specimen at a temperature of from 150 to 200° C., then by measuring the stresses in the thickness of the glass sheet. The measurement of the stresses may for example be carried out using a biasographe, described in chapter 8 of the book *"Photoelasticity of Glass"* by H. Aben, C. Guillemet (1993) Springer Verlag.

The glazing is curved. In order to achieve this, the two glass sheets are bent, generally together, before being assembled by means of the lamination interlayer. The bending may be carried out in a known manner, for example by gravity bending (the glass deforming under its own weight) or by press bending, at temperatures typically ranging from 600 to 680° C. During the bending, the inner glass sheet is placed above the outer glass sheet. As indicated previously, to prevent the glass sheets from sticking to one another during the bending, the glass sheets are preferably kept at a distance by positioning between them an interlayer powder that ensures a space of several tens of micrometers, typically from 20 to 50 μm. The interlayer powder is for example based on calcium carbonate and/or magnesium carbonate.

The lamination may be carried out in a known manner by an autoclave treatment, for example at temperatures of from 110 to 160° C. and under a pressure ranging from 10 to 15 bar. Prior to the autoclave treatment, the air trapped between the glass sheets and the lamination interlayer may be eliminated by calendering or by vacuum.

The direct solar transmission of the glazing is preferably at most 52%, in particular 50%, and even 48% or 46%, or else 45%. It is in general at least 35%. The direct solar transmission is determined according to the standard ISO 9050:2003.

The light transmission of the glazing is preferably at least 70%, in particular 71%. It is advantageously at most 80%, in particular at most 78% or 77% and even 75% or 74%. The light transmission is calculated from an experimental spectrum produced on the glazing considered, by taking into account the illuminant A defined by the standard ISO 11664-2 and the CIE 1931 reference observer) (2°) defined by the standard ISO 11664-1.

The thickness of the glazing is preferably at most 5 mm, in particular 4.5 mm, or else 4 mm. It is in general at least 2.8 mm, in particular 3 mm.

As indicated above, the invention makes it possible to prevent the appearance of edge corrugations following the bending, which is particularly difficult to obtain in the case of complex, large-sized and/or highly curved glazings.

The glazing preferably has a surface area of at least 1.5 m², or else 1.6 or 1.8 m².

The glazing is preferably doubly curved. It preferably has a double-bending depth (often simply referred to as "double-bending") of at least 20 mm. A glazing is doubly curved if it cannot be included in a surface generated by straight lines perpendicular to one and to the same plane. In practice, in the motor vehicle field, a glazing is said to be doubly curved when the cross sections of the glazing, in the plane of symmetry of the glazing and in a plane orthogonal to said plane of symmetry, exhibit a curvature. The double-bending is then defined as being the minimum of the largest bow in the planes parallel to the plane of symmetry of the glazing and of the largest bow in the planes orthogonal to said plane of symmetry. When there is no obvious symmetry, instead of the plane of symmetry, as reference, in the usage position of the glazing in the vehicle, the vertical plane parallel to the displacement (in a straight line) of the vehicle is taken for the glazings that are not side windows (windshields, roofs) and the vertical plane perpendicular to the displacement (in a straight line) of the vehicle is taken for the side windows. A last equivalent possibility is to take the vertical plane parallel to the displacement of the glazing in the bending furnace when this furnace is horizontal.

At least one glass sheet may be coated on a face turned toward the lamination interlayer with a stack of electrically-conductive and/or low-emissivity thin layers, in order to obtain a heated glazing or to further improve the thermal insulation of the glazing. Such a stack preferably comprises at least one thin silver layer flanked by at least two thin dielectric layers.

The lamination interlayer preferably comprises at least one sheet of polyvinyl acetal, in particular of polyvinyl butyral (PVB).

The lamination interlayer may be colored or colorless in order, if necessary, to adjust the optical or thermal properties of the glazing.

The lamination interlayer may advantageously have sound absorption properties in order to absorb airborne or solidborne sounds. It may in particular consist, for this purpose, of three polymeric sheets, including two so-called outer sheets of PVB flanking an inner polymeric sheet, optionally made of PVB, of lower hardness than that of the outer sheets.

The lamination interlayer may also have thermal insulation properties, in particular properties of reflection of the infrared radiation. It may, for this purpose, comprise a coating of thin layers with low emissivity, for example a coating comprising a thin silver layer or a coating alternating dielectric layers of different refractive indices, which is deposited on an inner PET sheet flanked by two outer PVB sheets.

The thickness of the lamination interlayer is generally within a range of from 0.3 to 1.5 mm, in particular from 0.5 to 1 mm. The lamination interlayer may have a thinner thickness on an edge of the glazing than at the center of the glazing in order to prevent the formation of a ghost image in the event of using a head-up display (HUD) system.

The following examples illustrate the invention in a nonlimiting manner.

Laminated curved glazings were manufactured as described in detail below. The inner and outer glass sheets were cut then positioned on one another, more specifically the inner sheet on top of the outer sheet, the two sheets being separated by an interlayer powder made of magnesium carbonate, making a space of around 20 μm between the two sheets. The two glass sheets, positioned on a bending skeleton, were then placed in a bending furnace in order to obtain the desired curvature. The bending cycle used is a conventional cycle for the production of windshields: a temperature increase for 380 s to reach a hold during which the glass sheets remain for 30 s at a maximum bending temperature indicated below, then cooling at a rate of 0.80° C./s. After cooling and washing, the inner glass sheet was chemically toughened by submerging the glass sheet in a molten potassium nitrate salt so as to obtain an upper surface stress of 550 MPa and a thickness in compression of 40 μm. The two glass sheets were then laminated in a known manner using a 0.76-mm thick PVB lamination interlayer.

The inner sheet is made of a sodium aluminosilicate clear glass. Its thickness is 0.5 mm. The $T10_{in}$ temperature of this glass (before chemical toughening) is equal to 665° C.

The outer sheet is made of a soda-lime-silica colored glass that is not mechanically reinforced. Its thickness is 1.6 mm. The content of total iron, expressed as $Fe_2O_3$, is 1%, with a redox ratio of 0.26.

In a comparative example, the chemical composition by weight of the soda-lime-silica glass was the following: $SiO_2$: 72.4%; $Al_2O_3$: 0.6%; $Fe_2O_3$: 1.0%; $Na_2O$: 13.4%; $K_2O$: 0.1%, CaO: 9.0%; MgO: 3.1%. The $T10_{out}$ temperature of this glass is equal to 635° C., so that $\Delta T10$ is equal to 30° C. The maximum bending temperature was 635° C.

In an example according to the invention, the chemical composition by weight of the soda-lime-silica glass was the following: $SiO_2$: 69.3%; $Al_2O_3$: 2.0%; $Fe_2O_3$: 1.0%; $Na_2O$: 11.9%; $K_2O$: 0.7%; CaO: 10.5%; MgO: 4.3%. The $T10_{out}$ temperature of this glass is equal to 660° C., so that $\Delta T10$ is equal to 5° C. The maximum bending temperature was 655° C.

In the case of the comparative example, edge corrugations are visible to the naked eye. These corrugations of the inner glass sheet appear as a periodic local detachment between the two glass sheets. At the edges, the inner sheet is, in places, detached from the outer sheet by a distance of 20 mm. On the other hand, in the case of the example according to the invention, no corrugation is observed.

The invention claimed is:

1. A curved laminated glazing comprising an outer sheet of a soda-lime-silica colored glass and an inner sheet of a chemically-toughened sodium aluminosilicate clear glass having a thickness e2 ranging from 0.4 to 1.1 mm, said outer and inner sheets being joined together by means of a lamination interlayer, said colored glass having a chemical composition comprising a weight content of total iron, expressed in the form $Fe_2O_3$, ranging from 0.6 to 2.2%, and the glasses of the inner and outer sheets being selected so that $0 \leq T10_{in} - T10_{out} \leq 20°$ C., where $T10_{in}$ is the temperature T10 of the glass of the inner sheet and $T10_{out}$ is the temperature T10 of the glass of the outer sheet, the temperature T10 being the temperature at which the glass considered has a viscosity of $10^{10}$ dPa.s.

2. The laminated glazing as claimed in claim 1, wherein a thickness e1 of the outer sheet is within a range of from 1.6 to 2.4 mm.

3. The laminated glazing as claimed in claim 2, wherein the ratio $R=e2/e1^2$ is at most 0.40.

4. The laminated glazing as claimed in claim 1, wherein the temperature $T10_{out}$ is within a range of from 655 to 675° C.

5. The laminated glazing as claimed in claim 1, wherein the temperature $T10_{in}$ is within a range of from 660 to 680° C.

6. The laminated glazing as claimed in claim 1, wherein $T10_{in} - T10_{out} \geq 5°$ C.

7. The laminated glazing as claimed in claim 1, wherein the colored glass has a chemical composition comprising the following constituents, in a weight content that varies within the limits defined below:

| | |
|---|---|
| $SiO_2$ | 68-75% |
| $Al_2O_3$ | 0-3% |
| CaO + MgO | 11-16.2% |
| MgO | 0-6.5% |
| $Na_2O$ | 9-12.4% |
| $K_2O$ | 0-1.5%. |

8. The laminated glazing as claimed in claim 1, wherein the weight content of total iron of the colored glass, expressed in the form $Fe_2O_3$, is within a range of from 0.7 to 1.8%.

9. The laminated glazing as claimed in claim 1, wherein the colored glass has a redox ratio, defined as the ratio between the weight content of ferrous iron, expressed in the form FeO, and the weight content of total iron, expressed in the form $Fe_2O_3$, ranging from 0.22 to 0.31.

10. The laminated glazing as claimed in claim 1, wherein the outer sheet is made of glass that is not mechanically reinforced.

11. The laminated glazing as claimed in claim 1, wherein a thickness of the laminated glazing is at most 5 mm.

12. The laminated glazing as claimed in claim 1, which is doubly curved and has a double-bending depth of at least 20 mm.

13. A glazing for a transport vehicle, comprising a laminated glazing as claimed in claim 1.

14. A process for obtaining a curved laminated glazing as claimed in claim 1, comprising:
   a bending step, wherein a sheet of a sodium aluminosilicate clear glass having a thickness e2 ranging from 0.4 to 1.1 mm, referred to as inner glass sheet and intended to become the inner sheet of the glazing, and a sheet of a soda-lime-silica colored glass having a chemical composition comprising a weight content of total iron, expressed in the form $Fe_2O_3$, ranging from 0.6 to 2.2%, referred to as outer glass sheet and intended to become the outer sheet of the glazing, are bent together, said inner glass sheet being positioned above said outer glass sheet, the two glass sheets being separated by means of an interlayer powder, then a chemical toughening step, wherein the inner glass sheet is bought into contact with a molten potassium salt, then a lamination step, wherein the inner and outer glass sheets are joined together by means of a lamination interlayer.

15. The laminated glazing as claimed in claim 1, wherein the thickness e2 is from 0.4 to 0.7 mm.

16. The laminated glazing as claimed in claim 3, wherein the ratio $R=e2/e1^2$ is at most 0.30.

17. The laminated glazing as claimed in claim 8, wherein the weight content of total iron of the colored glass, expressed in the form $Fe_2O_3$, is within a range of from 0.8 to 1.5%.

18. The laminated glazing as claimed in claim 9, wherein the weight content of total iron, expressed in the form $Fe_2O_3$, ranging from 0.24 to 0.29.

19. The laminated glazing as claimed in claim 11, wherein the thickness of the laminated glazing is at most 4 mm.

20. The glazing for a transport vehicle as claimed in claim 13, wherein the transport vehicle is a motor vehicle and the glazing is a windshield or a roof.

* * * * *